United States Patent [19]
Peters et al.

[11] Patent Number: 4,616,319
[45] Date of Patent: Oct. 7, 1986

[54] STORAGE OF DIGITIZED VIDEO IMAGES ON DISK

[75] Inventors: Michael A. Peters, Waukesha; Gerd Mewitz, New Berlin, both of Wis.

[73] Assignee: General Electric Company, Schenectady, N.Y.

[21] Appl. No.: 638,286

[22] Filed: Aug. 6, 1984

[51] Int. Cl.⁴ .................... G06F 3/00; G06F 15/42
[52] U.S. Cl. .................... 364/414; 378/99; 378/901; 358/111; 358/903
[58] Field of Search ............ 364/413–414, 364/200 MS File, 900 MS File; 378/4, 44–46, 98–100, 190–191, 901; 360/33.1, 35.1, 133, 135; 358/111, 335, 342, 903

[56] References Cited
U.S. PATENT DOCUMENTS

| 4,367,490 | 1/1983 | Riederer | 378/99 |
| 4,375,068 | 2/1983 | McBride | 378/99 |
| 4,380,818 | 4/1983 | Pfeiler | 378/99 |
| 4,393,402 | 7/1983 | Keyes et al. | 358/111 |
| 4,433,380 | 2/1984 | Abele et al. | 364/414 |
| 4,449,195 | 5/1984 | Andrews et al. | 364/900 |
| 4,533,947 | 8/1985 | Smith | 358/111 |
| 4,542,459 | 9/1985 | Riederer | 364/414 |
| 4,558,575 | 12/1985 | Sontheimer | 358/342 |

Primary Examiner—Gary V. Harkcom
Attorney, Agent, or Firm—Fuller, House & Hohenfeldt

[57] ABSTRACT

Digital pixel values for each image frame are written onto pages of a disk buffer memory (DBM) under video frame timing and are read from memory and written on disk under disk timing. When the last page of the DBM is reached, readout is switched back to the first page. Only DBM locations for pixels within the circular boundaries of the image are addressed during reading and writing. Groups of adjacent pixels are written simultaneously on the several disks under control of clocks that are derived from disk. A circuit corrects for skew resulting from asynchronism between the disks. A converter converts serially recorded pixels of any bit length to parallel bits of the same number as before they were serialized. The commands for the disk drive are put in registers for one disk index pulse and they are ready for execution when the next index pulse occurs.

2 Claims, 10 Drawing Figures

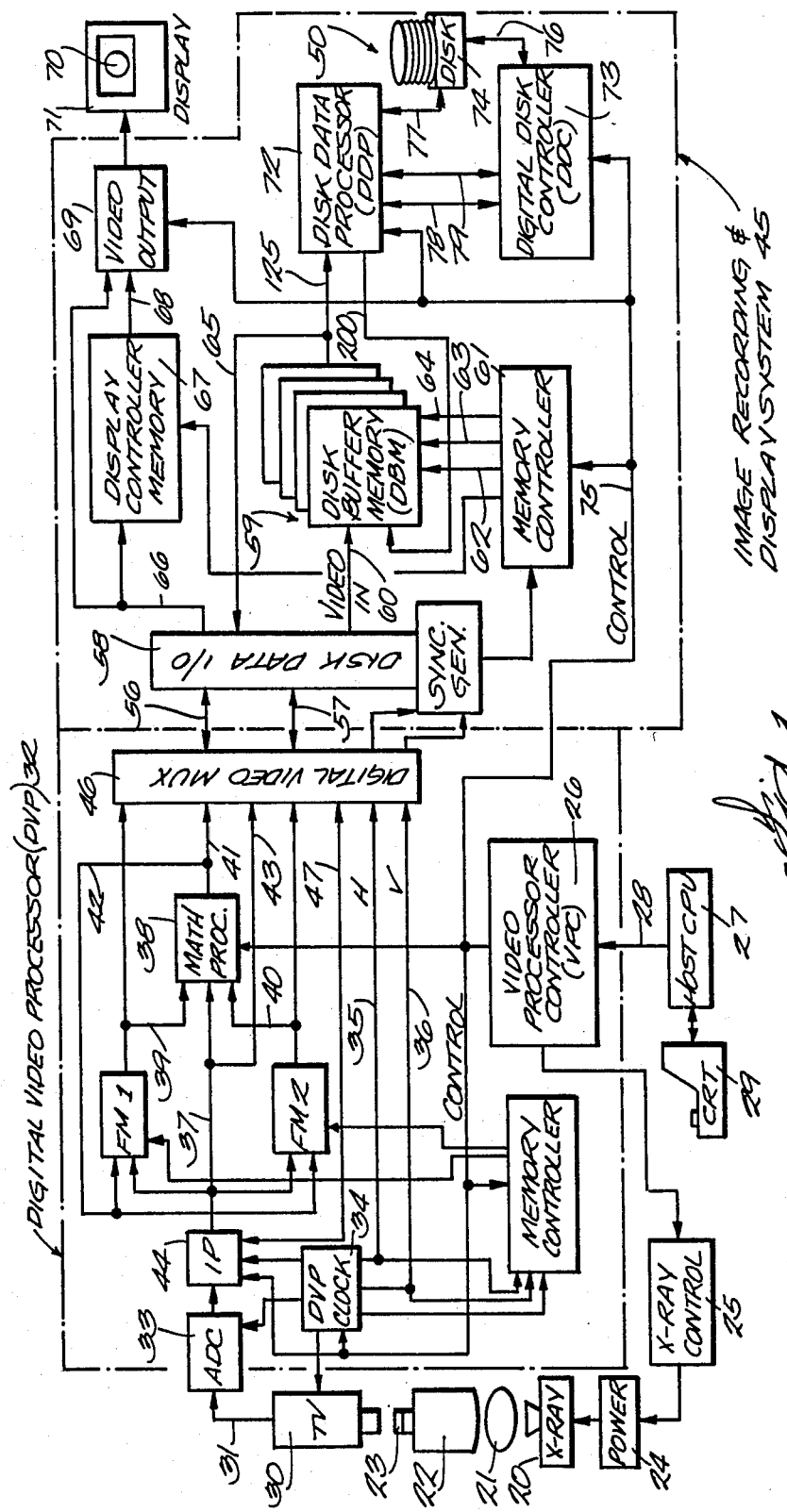

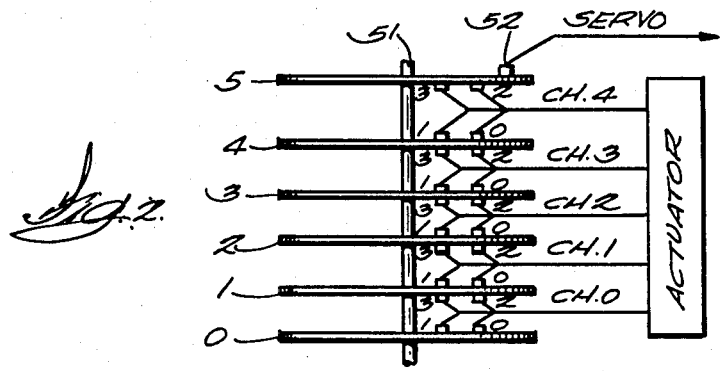
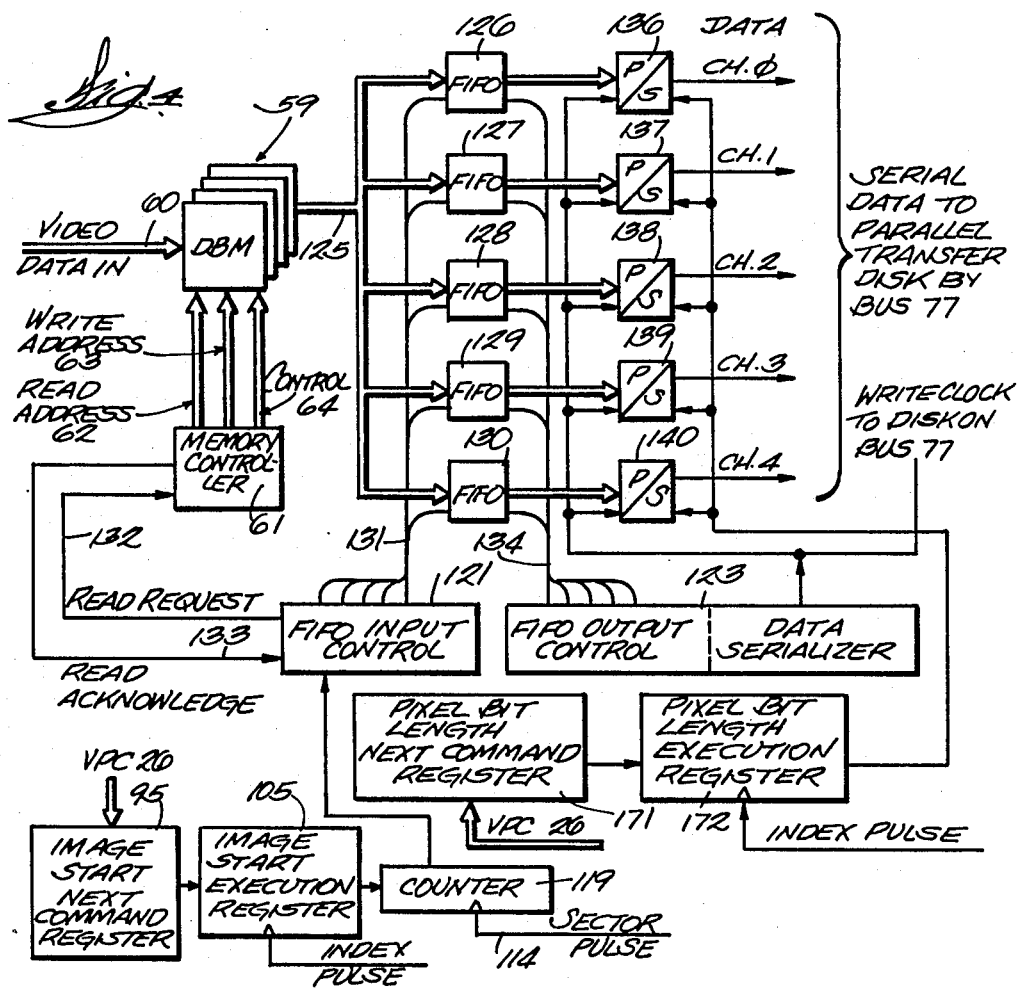

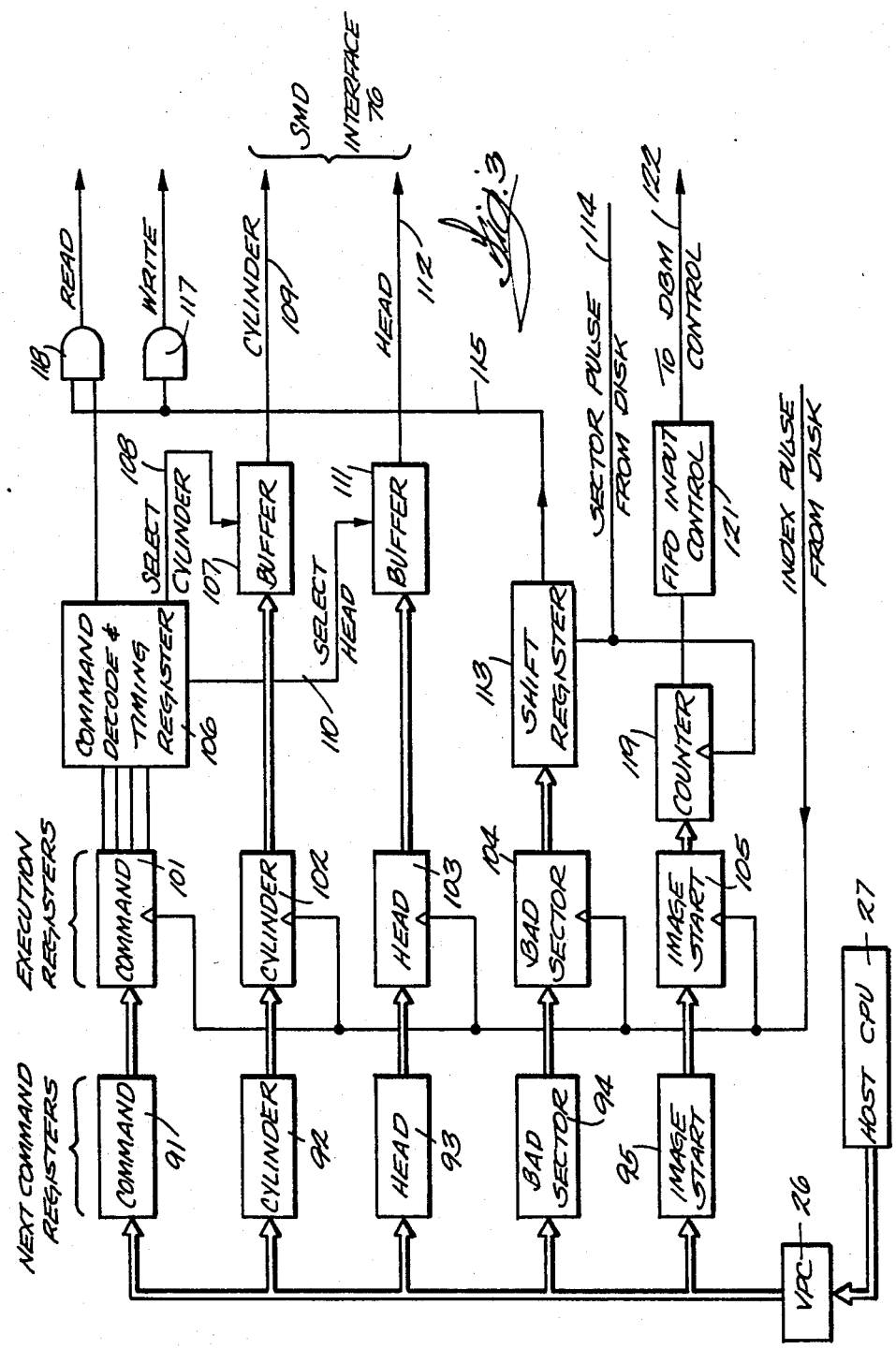

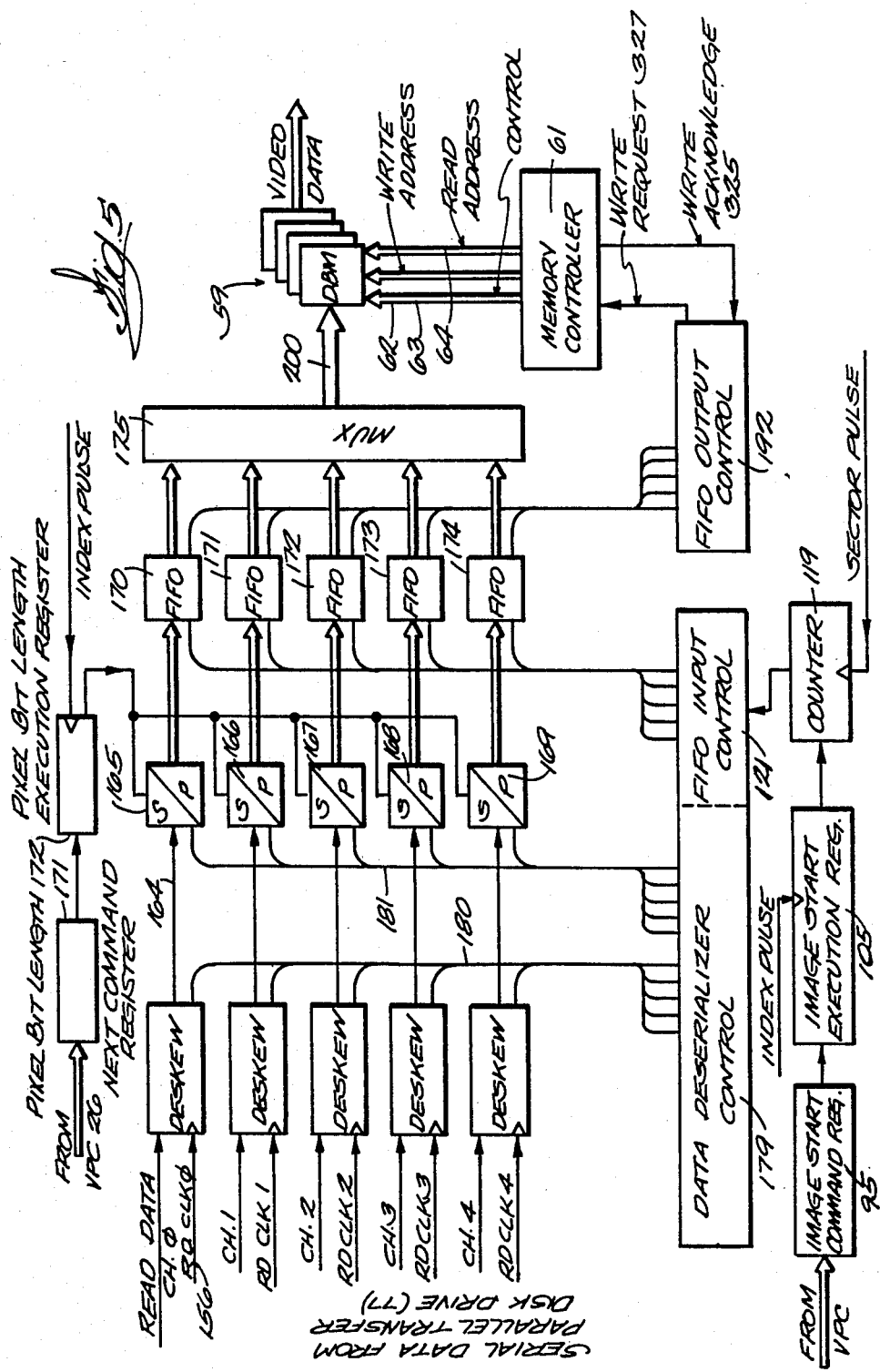

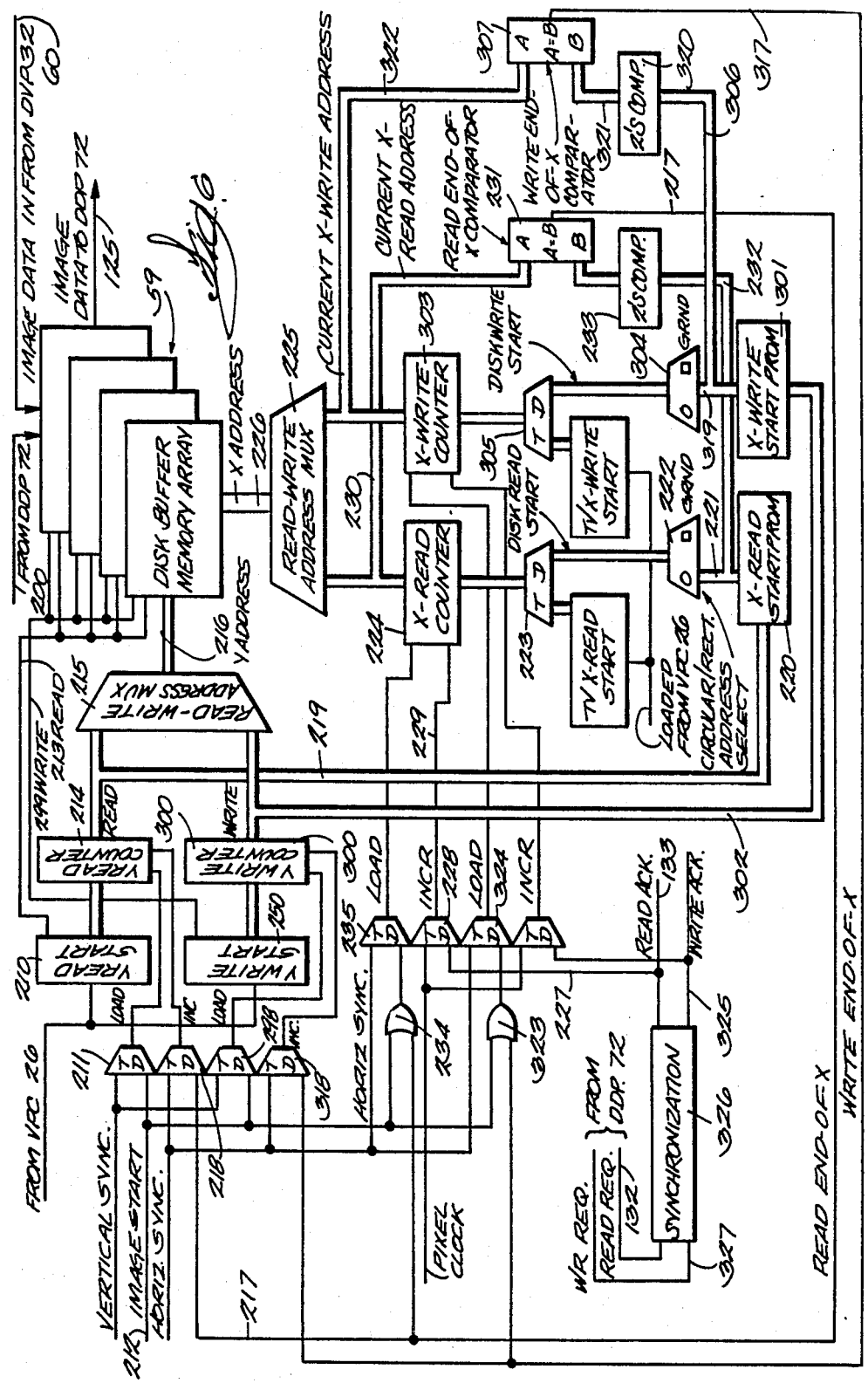

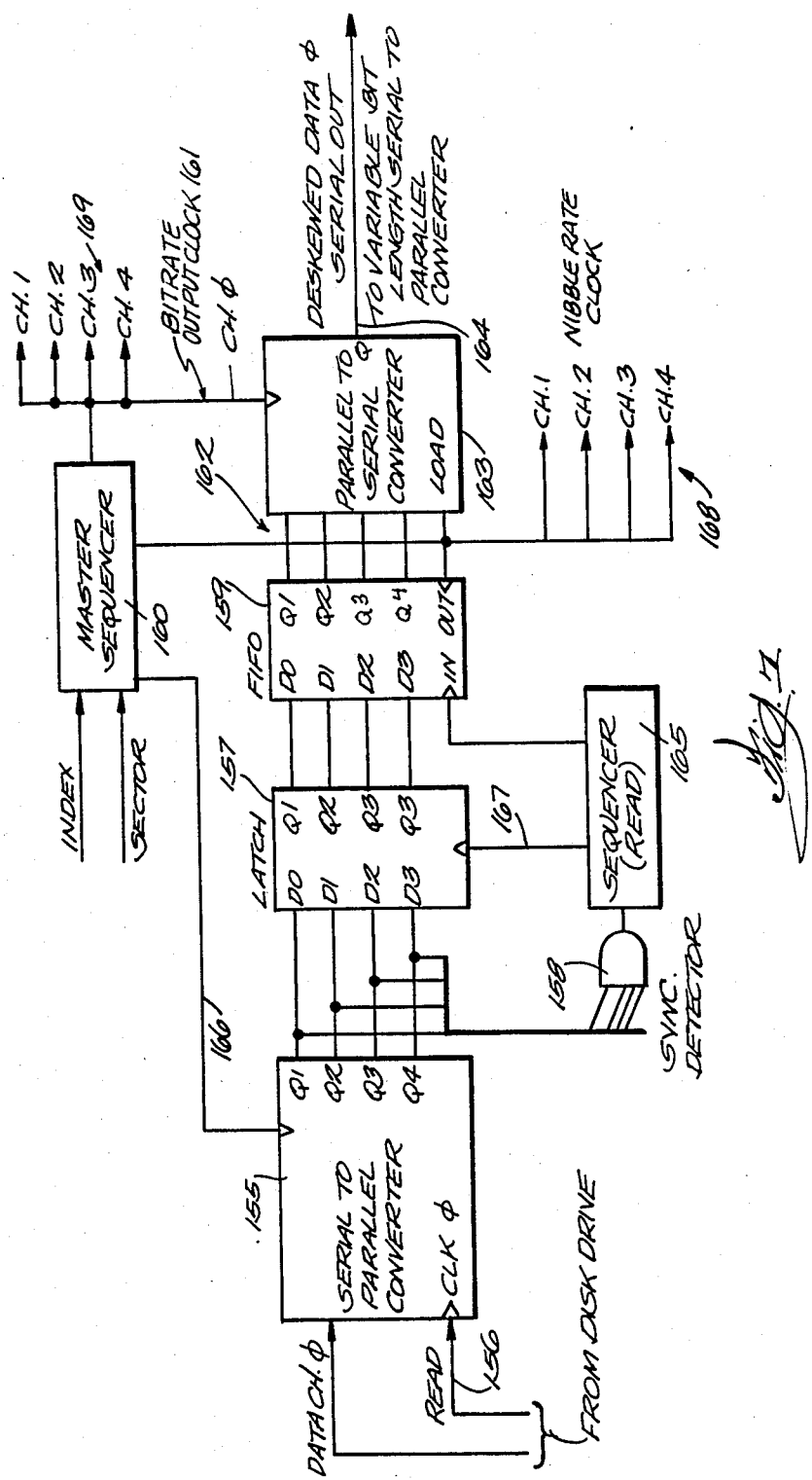

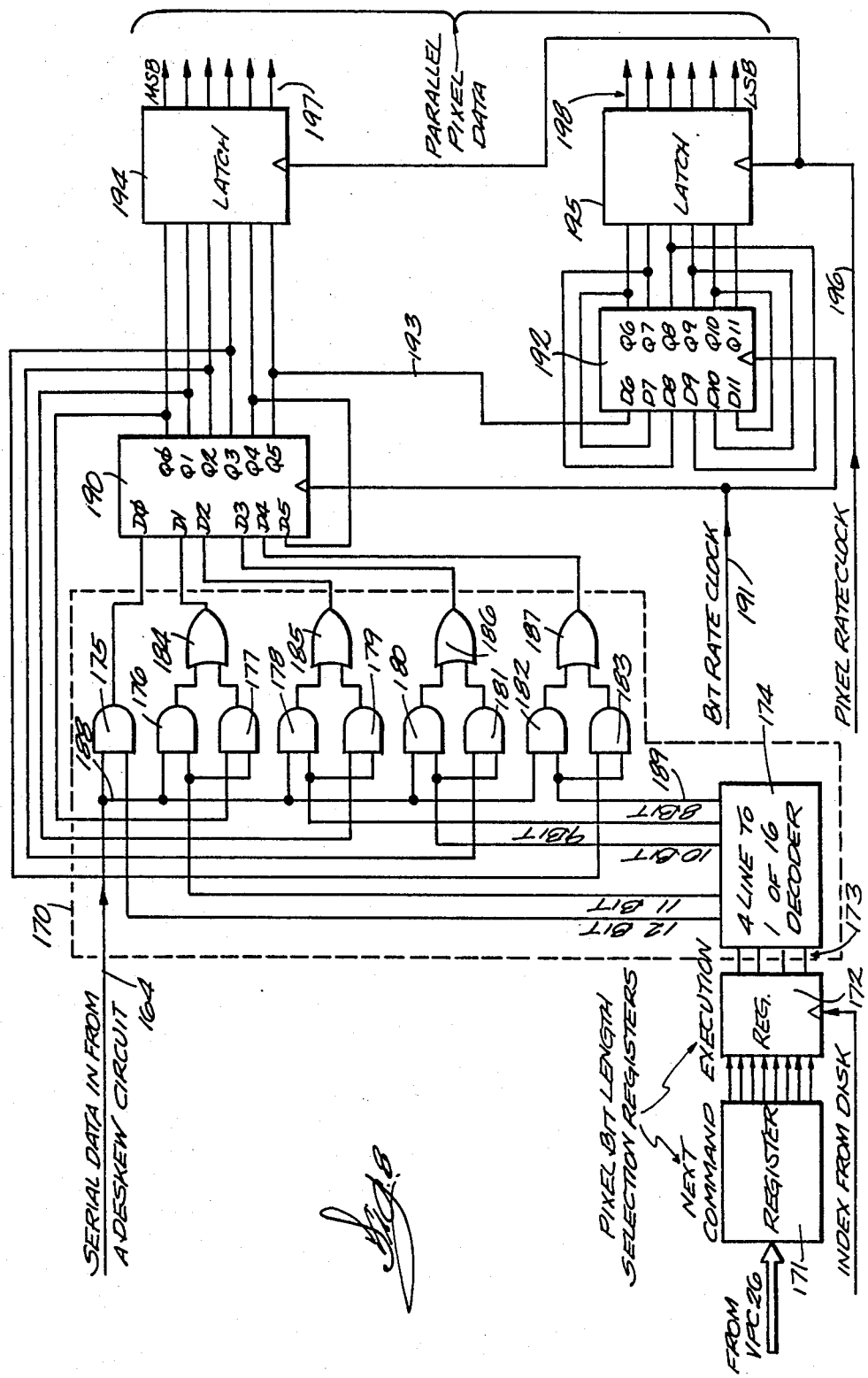

*IMAGE TIMING SEQUENCE*

STORAGE OF DIGITIZED VIDEO IMAGES ON DISK

BACKGROUND OF THE INVENTION

This specification is common to related copending applications having serial Nos. 637,841; 637,873; 638,286; and 638,291, all of which were filed on Aug. 6, 1984, and 637,294 which was filed on Aug. 3, 1984 and is now U.S. Pat. No. 4,571,619, dated Feb. 18, 1986. all of the cited applications are assigned to the same assignee as this application.

The inventions disclosed herein pertain to method and apparatus for storing digitized images on magnetic disk in real-time, with no delay between images in excess of the vertical blanking time.

The inventions will be illustrated herein in a system for recording and displaying a continuous screen of digitized X-ray images, but those skilled in the art will appreciate that the inventions are applicable to various systems for recording on a magnetic medium, such as a magnetic disk, digitized images that are generated in rapid order and images that are generated with a substantial time interval between them as well.

In digital fluorography, X-ray images emerging from the body are received by an image intensifier which converts them to optical images. The optical images are viewed by a video camera which converts them to analog video signals. The analog video signals for each horizontal scan line composing an image frame are digitized and the resulting digital data are usually stored, at least temporarily in a frame memory. Typically, images are processed in a digital video processor containing more than one full frame digital memory and an arithmetic logic unit so that one or more images in a sequence could be weighted and subtracted from another, for example, and the resulting image data stored. Before the inventions described herein were made, it had been necessary to reconvert the digital image data back to analog video signals for storage on analog magnetic disk. Analog video signal recorders had to be used because available digital disk recorders were not fast enough to record X-ray images produced at rates of thirty frames per second. One disadvantage of being constrained to use an analog video disk recorder is that it is necessary to reconvert the images back to digitized format before the images can be processed or treated again in the digital video processor circuitry. Re-digitization of the analog video signals introduced errors such as quantitization errors, noise errors and time base errors. The latter errors are a consequence of the images being produced and reproduced for display where the vertical sync rate of the video system is the time base while the images are stored on analog disk and retrieved from disk in reference to the time base of the disk drive. The errors mentioned, among other things, reduced the accuracy of registration between corresponding picture elements (pixels) in a sequence of images so, for example, sharpness of any subtracted images or otherwise reprocessed images was not optimal. Another disadvantage of the state of the art analog disk recorders is that they have limited storage capacity at tolerable signal-to-noise ratios and bandwidths. Still another disadvantage is that they allow a maximum pixel intensity range equivalent to about eight digital bits, that is, to about 256 intensity gradations, whereas certain processing techniques may generate data equivalent to up to twelve significant bits per pixel and some image acquisition modes generate 10-bit data per pixel. For analog storage of any of these images the data had to be compressed to eight bits.

Prior digital X-ray image processing systems using analog image storage techniques are described in U.S. Pat. No. 4,393,402 issued to Keyes, et al. and No. 4,449,195 issued to Andrews, et al. These patents are owned by the assignee of this application and their entire disclosures are incorporated herein by reference.

Digital disk recorders using Winchester drives have been available but were not fast enough for real-time recording of digitized images. The recording and retrieval rates of prior disk recorders have been limited by the fact that the pixel data had to be input to the write head in serial form so it could be written on one disk track after another on the same disk. Pixel data comes in too fast for being written without overlap.

A parallel input Winchester disk drive has recently been developed. It employs one drive and several disks on which parallel input data can be written simultaneously and read out simultaneously. The new drive is readily adaptable for increasing data storage rates in computer systems where data is generated and latched in storage until the disks are able to receive the data. However, in digital fluorographic applications, for example, a long sequence of image frames are frequently generated at the rate of thirty frames per second continuously with only a video blanking interval between them. When image data is being generated the disk drive must be available for recording on a continuous basis or parts of the data will be lost forever. The problems resulting from the time base of the video image acquisition system differing from the time base of the digital disk drive in the prior serial data input disk drive are still encountered in the recently available parallel data input disk drive.

SUMMARY OF THE INVENTION

In accordance with the invention, a new method and system has been developed to accomplish real-time recording of continuously produced video images with a multiple channel or parallel input digital disk drive. A known type of digital video image processor (DVP), such as the one shown in the previously cited U.S. Pat. No. 4,449,195, operates on the video image frame data at rates that are synchronous with the video vertical blanking intervals. A video processor controller (VPC) governed by a host computer or central processing unit (CPU), configures or switches or sets up the circuits in the DVP in its next operating mode during every video vertical blanking interval. For the VPC to control the disk drive in a manner that synchronizes the streaming data transfer to and from the disk drive with vertical blanking, an interface including a multiple page buffer memory is provided. Each page can hold the data for a complete image frame that is to be written on disk or read from disk. A disk data processor (DDP) receives and transmits the image pixel data to and from the disk drive. The several magnetic disks are driven together at fixed rotational speed and transmit an index pulse once per revolution as in conventional Winchester drives. The DDP and the digital disk controller (DDC) employ a double buffering scheme wherein commands from the VPC are loaded to the DDP and DDC and are queued until the next index pulse arrives. Then the queued commands are executed and the VPC loads another set of commands.

To accomplish real-time video rate image storage and retrieval, the VPC combines data transfer commands, such as read or write and disk head actuator positioning commands into multi-task fast commands such as read and step heads or write and step cylinders and heads. Thus, the disk drive can be conditioned for the next frame of image data without wasting one revolution. The DDC and DDP have double buffered status registers that are latched on the leading edge of each index pulse such that the VPC has until the next index pulse to read the commands back.

To compensate for asynchrony between the video data transfer at a vertical blank time base and the disk drive timing, multiple page disk buffer memories (DBM) are used, for example, as a four frame first-in first-out (FIFO) memory to permit image data to be transferred to or from any one frame memory or page at video rates while another page is being filled or read out at disk timing rates.

The disk drive is optimized for image storage by dividing each revolution into sectors. Recording medium defects are mapped out so there is no recording in a defective sector. A defective or bad sector map is included in the command packet loaded by the VPC each revolution. Each bit of this map corresponds to a sector and the read or write operations are performed only if the bit related to the sector is set. In contrast to prior art disk recording practice where defective sector identification was stored in the CPU memories, in the present invention the bad sector map is stored in the video processor controller or VPC so it can be directly transmitted with other commands. Thus, no time is lost by reading from or writing into a track within a bad sector.

In addition to the novel overall system arrangement just outlined, several additional inventions which make real-time video rate image recording on disk possible within the recording speed limits of the disk, are described herein. One of the inventions constitutes a method and circuitry for limiting data transfer to the disk drive to only the useful diagnostic image data. By way of example, the input and output phosphors of the X-ray image intensifier are circular so a circular image charge pattern is developed on the target of the video camera. The target is read out in a raster scan format and the resulting digitized data for an X-ray exposure is addressed to and stored in rectangular coordinate format in one of the disk buffer memory pages. Thus, there are a lot of digital pixel storage locations surrounding the circular image in the buffer memory page which contains no useful diagnostic information. In accordance with one new feature during transfer of image data from a full frame buffer memory page, only the useful pixel data within the circular area is addressed for transfer to disk so that no time is consumed by reading out buffer memory locations containing no image data. This prevents exceeding the writing rate of the parallel input disk drive. Likewise, when an image is retrieved from disk for transfer to a buffer memory page for ultimate display on the video monitor, it is only locations in the memory that define the circular image that are filled with pixel data.

In accordance with the invention, groups of consecutive pixels, that is, a number of pixels corresponding with the number of platters or disks, are fed to the write heads qf the disk drive for simultaneous recording on the respective disks. The pixels are supplied in parallel to the write heads but their bits are laid down in serial order on a corresponding track within a corresponding sector on each disk. During writing to the disk drive, all parallel data is clocked with the same clock. The write clock originates from the servo track of the disk drive. During reading from the disk drive, a clock is transmitted with the data from each parallel channel. These individual read clocks can be out of synchronism with each other so that each read clock can be used only for its specific channel. The lack of synchronism between parallel channels would result in the pixel data being skewed out of its proper place after readback from the disk drive. One new feature disclosed herein is a circuit for deskewing the data so that when pixel data is read out from disk or being transferred to the disk buffer memory, DBM, it can be addressed to the proper locations in the DBM for reconstituting the circular image with all pixels in proper spatial relationship to each other.

In an imaging system of the character described herein, particularly in X-ray imaging, there are times when it is necessary or desirable to define pixel intensities with digital words of different bit lengths. For instance, when video images are being recorded at video frame rates in real-time the recording rate limitations even of the new parallel transfer disk drive, may permit transfer of only 8-bit length pixels. In some fluorographic procedures, on the other hand, images are acquired at substantially spaced apart images so that there will be time for recording pixels having 12-bit lengths.

Another distinct invention disclosed herein for use in the multiple channel disk drive system is a serial-to-parallel converter that is programmable to convert serial pixel data into words or pixel values of selected bit length such as any one of 8 to 12-bit lengths.

The manner in which the foregoing inventions are implemented will now be described in greater detail in reference to the drawings.

DESCRIPTION OF THE DRAWINGS

FIG. 1 is a block diagram of a system comprised of three major sections, one for producing video signal representations of images, another for acquiring and processing image data and another for recording images on magnetic disk, for retrieving images from disk and for displaying images as they are produced or when they are retrieved from disk;

FIG. 2 is a diagram of a parallel data input disk writing and reading head arrangement;

FIG. 3 is a diagram of the principal components of a disk controller used in the recording system;

FIG. 4 is a diagram of circuit components involved in conditioning image data for writing on the recording disks or platters;

FIG. 5 a diagram of circuit components involved in reading data from disk and writing it into the disk buffer memory;

FIG. 6 is a diagram of the components of a memory controller. Included in this figure are those components involved in restricting data transfer to and from disk to that data which comprises a useful circular image area;

FIG. 7 is a circuit for deskewing pixel data that is being read out from the parallel transfer disk drive;

FIG. 8 is a diagram of a variable bit length serial-to-parallel converter;

DESCRIPTION OF A PREFERRED EMBODIMENT

Figure 9:
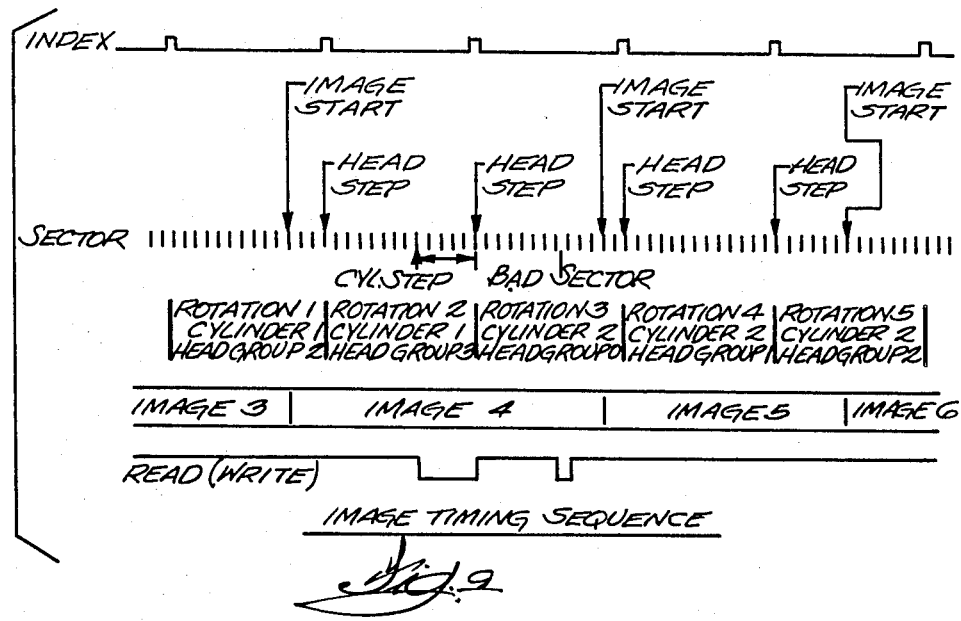
FIG. 9 is a diagram for explaining timing involved in recording on parallel transfer disk in accordance with the invention.

FIG. 1 provides one example of where images are acquired and must be recorded at video frame rates. Referring to the leftmost region of FIG. 1, the image acquisition system comprises an X-ray source 20 for projecting a continuous or pulsed X-ray beam through a body 21 such that the image emergent from the body is received by an image intensifier 22. The intensifier converts the X-ray image to a corresponding optical image which appears in bright and minified form on the circular output phosphor which is indicated by the dashed line marked 23. The X-ray source 20 is energized with a power supply 24 that is conventional and need not be described. The timing of the X-ray exposure intervals is controlled by a controllor 25 which, in turn, is timed by signals from a video processor controller (VPC) represented by the block marked 26. The host central processor unit (CPU), represented by the block marked 27 acts as an overall system controller. Its buses are designated collectively by the line marked 28. The programs stored by CPU 27 are called up by the operator's use of a cathode ray terminal 29. The functions of the VPC will be discussed at various times later since it is involved in bringing about arbitration of the image acquisition timing and the different disk writing and reading timing.

Still referring to FIG. 1, the optical images appearing on output phosphor 23 of image intensifier 22 are received in a TV or video camera 30. As a result of scanning the target of camera 30, the circular optical image appearing on phosphor 23 is converted to analog video signals on a horizontal line by horizontal line basis. The analog video signals produced by camera 30 are input, by way of line 31 to an analog-to-digital converter 33 and then to a digital video processor (DVP) 32 which is demarked by a dashed line irregular rectangle. The DVP 32 is generally similar to the processor described in previously cited Andrews, et al. U.S. Pat. No. 4,449,195. The analog video signal must first be converted to digital pixel values by the analog-to-digital converter 33. The first stage of DVP 32 is an input processor 44 which contains lookup tables, not shown, for converting the pixel values to corresponding logarithmic values although this conversion may be done at any time before or after the images are recorded on magnetic disk. The analog video signals for each horizontal line are converted, by way of example and not limitation, to pixel values up to 12-bits in length at a pixel clocking rate of about 12.096 MHz. The pixel clock and the timing signals for establishing the horizontal and vertical blanking and other camera signals are derived from a line-locked oscillator clock illustrated by the block marked 34. It is shown in a symbolic way that horizontal blanking pulses H and vertical blanking pulses, V, are obtained from DVP clock by way of lines 35 and 36 for use in the disk recording process as will be discussed later. For real-time storage of continuous imaging frames on disk, the digitized pixels may be transmitted by way of an output bus 37 from input processor 44 directly into the image recording and display system which is demarked by a dashed line rectangle that is so labeled and marked 45. Two full frame memories labeled FM-1 and FM-2 are provided. They can receive digital pixel data directly from the output of input processor 44 or data that is to undergo reprocessing as will be explained. A digital video multiplexer (MUX) 46 provides the interface between the DVP 32 and the image recording system 45. It provides two data buses 56 and 57. Bus 56 is display data, selectable between bus 39, which is the contents of frame memory FM-1 and bus 40 which is the output of a math processor 38, or bus 37 which is the incoming digitized pixel bus. The other data bus 57 provided by MUX 46 is the disk data bus which supports bidirectional data flow on a frame-by-frame basis between DVP 32 and the image recording and display system 45. It is normally used as an extension of bus 47 to accept input processor data during image acquisition or to provide data to the input processor 44 during image data reprocessing within the DVP 32. While the most evident path of data flow to the disk is from bus 47 within DVP 32, MUX 46 also allows transfer of buses 39, 40 and 41 to the image recording subsystem over bus 57.

Although achievement of storing of images at video frame rates on magnetic disk is the objective of the invention described herein, it may be noted that the DVP 32 is operative to process image data in various ways. For instance, in some fluorographic procedures various images are weighted and subtracted from each other or images may be integrated, for example. In one case, instead of the pixel data for frame-after-frame going directly to MUX 46 for realtime recording, the data for consecutive frames may be sent to full frame memories FM-1 and FM-2, respectively, so that the image data may be fed by way of buses 39 and 40 to math processor for weighting and, for example, subtraction. It is also possible with DVP 32 to retrieve image data that has been recorded by way of bus 47 and input that data to one or the other of the memories FM-1 or FM-2 or both by way of wraparound bus 42. Raw video data can also be sent directly to digital video MUX 46 by way of a bus 43 which branches off of bus 37. In any event, the acquisition of X-ray images in digitized video signal form is referenced to the video vertical blanking signal time base. As explained in U.S. Pat. No. 4,449,195, the host CPU 27 sends a complete recipe for a procedure to the memory of the video process controller 26 that controls DVP 32. The latter interprets instructions and effects configurations and reconfigurations of the data paths of the DVP during television vertical blanking intervals. Thus, after each video image is read out from the camera 30, the DVP 32 is conditioned or configured by signals from VPC 26 to do any necessary processing of the image data or simply let it go directly through to the image recording and display system 45 if real-time recording on disk is desired.

The parallel transfer digital disk recorder is designated generally by the reference numeral 50 in FIG. 1. The arrangement of the multiple disks and the recording heads can be seen in greater detail in FIG. 2. Six magnetic disks, 0 to 5, are shown in FIG. 2 mounted for simultaneous rotation on spindle 51. Although the disk drive is not shown in this figure, it is basically the well known Winchester type. The disk recorder differs from conventional recorders in that the data is written on disk and read from disk through five parallel channels, CH.0 to CH.4. The uppermost disk 5 has the timing pulse train recorded on one of its channels and a magnetic read head 52 derives high frequency timing pulses for regulating disk rotational speed and other purposes. As indicated, the timing data recorded on the upper surface of disk 5 is provided to the disk servo system and other destinations. Each channel line leads to a tree of four read-write heads, 0 to 3. In the system under discussion, a corresponding group of write heads such as those marked 0 would be active in each channel at any given time. In the present invention, before pixels are transmitted to the disk heads for writing on disk, they are converted to serial bit streams. The bit streams comprising a sequence of adjacent pixels in the image are supplied in parallelism over the five channels simultaneously so that the first pixel in the sequence would be recorded as a series of bits on the lowermost disk 0 through write head 0. The next adjacent pixel would be recorded simultaneously on the top of disk 1 through the write head 0 associated with channel 1 and so on through channel 4. The next five consecutive pixels with their bits in series in a horizontal scan line of video image would similarly be directed down the five channels to be written by way of write head 0 while the heads are on a given cylinder. Thus, if data were being read from a frame memory having x,y coordinates, consecutive pixels would be at identical locations along the recording tracks of the disk but would be on different disks.

By way of example and not limitation, each disk in an actual embodiment of the invention is divided into thirteen sectors. In this particular case, in view of the permitted bit packing density, if the tracks in all sectors are without defect, it takes twenty-one sectors to record an image that is comprised of 512×512 pixels of 8-bit length. In this particular example, there would be about 262 kilobytes per image. At thirty images or video frames per second, about 7.86 megabytes per second would have to be recorded. The disk in the chosen disk drive rotate at 3,961 rpm with a slight variation. Each disk, for example, is capable of receiving 1.859 megabytes per second. Using five disks, the total permissible rate to the disks would be about 9.3 megabytes per second which is greater than the image data input rate but, this surplus capacity or recording rate is used for recording identification information which is typically required with Winchester drives such as the physical record length, the record number, the head number, the cylinder number, synchronizing information and address marks which are necessary to establish where the information is recorded and from where it can be retrieved. In prior art Winchester drives using a single disk and a single read-write head on each side of the disk, the identification information is recorded on each sector of the disk but, in accordance with the invention, this information is recorded in only one of the sectors on any given track. As will be explained, means are provided for determining when all of the thirteen sector tracks of the twenty-one sectors required for recording an image are filled so as to require, for example, a step from recording with heads 0 to recording with heads 1 and to step to a new cylinder when the tracks under all of the heads have completed recording an image or are filled.

Once every revolution of the disks, the disk drive issues an index pulse. The drive is also adapted to issue a timing pulse indicative of the beginning of each sector. Data is written on each disk in synchronism with high frequency timing pulses or clock pulses that originate from the servo head. As pointed out earlier, when the data are read out from the disks, each disk is clocked out with its own individual clock so that the pixel groups that are transferred out of disk in parallel may be skewed with respect to each other in time. The new deskewing circuit disclosed herein overcomes that problem. Further by way of an example using concrete numbers to facilitate understanding, in the actual embodiment mentioned earlier, each disk revolution takes fifteen milliseconds that during which the tracks in thirteen sectors become filled whereas it takes thirty-three milliseconds to store an image so, as indicated above, a step from one track to another is always necessary to record an image frame.

Referring again to the block diagram of the system depicted in FIG. 1, the digitized pixels comprising a video image are fed from the DVP 32 by way of a bus 57 to a disk data input-output interface 58 and to a disk buffer memory 59 by way of a video input bus 60. The disk buffer memory (DBM) 59, as will be explained in greater detail later, is the elastic component in the system for compensating the asynchrony between the video image acquisition and disk writing and reading. DBM 59 is organized as a memory with four pages each of which can store a full image frame. The DBM operates as a circular memory. For instance, when the first video image data comes in it is addressed to one of the buffer memory pages and there is no transfer of image data to magnetic disk recorder 50 until the complete image is written on the pages. Then, in response to appropriate signals from the video process controller (VPC) 26, readout of the first memory plane onto the disk drive begins. Meanwhile the next memory plane or page is being filled with data from the next image. By the time the last of the four memory pages is read out, the first one which was previously emptied is being filled with fresh image data. In other words, the memory pages are read out cyclically to the disk recorder 50 so the disk recorder cannot fall behind video image production.

DBM 59 in FIG. 1 is controlled by a memory controller which is represented by the block marked 61 which will be discussed in more detail later. The memory controller has control, write address and read address buses 62, 63 and 64 coupling it to DBM 59. These buses provide the read and write addresses and necessary control and timing signals to the disk buffer memory 59 for simultaneous video write and disk read or simultaneous disk write and video read of the contents of the disk buffer memory. During disk read operations bus 125, which is an extension of bus 65, contains disk rate data. During video read operations bus 125 is not used but bus 65 contains video rate read data. Data can also be read out of DBM 59 and, by way of a bus 65, to the disk data input-output (I/O) interface and from there by way of a bus 66 to a display controller memory 67. The display controller is conventional and its memory 67 can be refreshed at the incoming video image rate. The output bus 68 from the display controller memory 67 is input to a video output circuit 69 wherein the digital pixel signals are converted to analog video signals for display of the circular image 70 on the raster scanned screen of a cathode ray tube display or television monitor 71. In an actual embodiment, the video output circuit has an input from a source, not shown, of digital graphic data which is converted to analog video signal form in the video output circuit and added to the video signal so that the graphics data can be written on the display screen in the spaces around the circular optical version of the X-ray image 70.

Other principal components of the image recording and display system in FIG. 1 are the disk data processor (DDP) 72, the digital disk controller (DDC) 73 and the disk drive 74. DDP 72 serves as the interface device for transferring data from DBM 59 to disk 50 and from disk 50 to DBM 59. As shown in FIG. 1, a control bus 75 leads from video processor controller (VPC) 26 to several components of the system. As stated earlier, the VPC must control the digital disk system in a manner that synchronizes the streaming data transfer to and from the disk drive with the video vertical blank time. DDP 72 is coupled to disk drive 74 by the data bus 77. The DDC 73 is coupled to the disk drive by the control bus 76. DDC 73 and DDP 72 are also coupled by control and address buses 78 and 79.

Now that the system has been outlined, reading and writing on disk will be examined in greater detail.

Attention is invited to FIG. 9 which illustrates the image timing sequence. As shown in the top line of FIG. 9, an index pulse is generated by the disk once for every simultaneous revolution of the disks. In this particular example, the disk has been divided into thirteen sectors and the disk produces a sector pulse indicative of the beginning of each sector. In view of the writing density capability of the disk drive used in this example, calculation showed that twenty-one sectors would be required to write a 512×512 pixel, 8-bit per pixel image. FIG. 9 demonstrates a number of characteristics of a disk drive controlled in accordance with the invention. Assume that an image is being read from disk buffer memory, DBM 59, and is being written on disk. Image No. 3, which was stored on one page of DBM 59 was completely read out during disk rotation 1 on cylinder 1 using head groups 2. Image No. 4 started where indicated. As shown, there was still four sectors available on the track used for rotation 1 before rotation 2 started. Immediately preceding the start of rotation 2, it became necessary to step to the next head group 3 indicated by the arrow labeled head step. During rotation 2, the pixel data is written by cylinder 1, head group 3 onto the disk drive. During rotation 3, the pixel data must be written by cylinder 2, head group 0, therefore a cylinder step and a head selection change must take place at the end of rotation 2. This cylinder step and head selection change will take place during the last five milliseconds of rotation 2. In this particular disk drive, it takes about five milliseconds or the time of five sectors to step to another cylinder and such stepping was anticipated by the VPC 26 to be necessary. Hence, as illustrated in the lowermost waveform in FIG. 9, VPC 26 caused the write signal to go low during this time so readout of the page and disk buffer memory containing image 4 stopped for five sectors. The five sector times were used to move or step to cylinder 2 and head group 0. Readout of the page in DBM 59 that contained image 4 resumed after the transfer to cylinder 2 was made during the second revolution. Readout continued through rotation 3 and, as indicated, in this particular disk a defective or bad sector existed. The VPC 26 stores in its register the identity of the bad sectors and, as can be seen in the lowermost waveform in FIG. 9, the VPC interrupted writing on the disk for the one bad sector and, of course, readout of the page containing image 4 was also interrupted so that no image data was lost. Image No. 5, on another page in DBM 59, began to be written on disk coincidentally with the end of the last sector required for image 3. While image 5 was being written during rotation 4 a switch to head group 1 was accomplished but there was no need to interrupt writing because such switch can be made during the time between sector pulses. Image 5 represents the ideal case where there are no bad sectors and it is recorded in twenty-one sectors, some of which are on a different track as indicated by the head group switches from 0 to 1 to 2. Reading from disk to DBM 59 is governed in the same way as writing on disk.

As demonstrated in the foregoing discussion, in accordance with the invention, the only time read-out of a page in DBM 59 is interrupted for about five milliseconds, or five sectors in this example, is when it is necessary for the disk drive actuator to physically shift all of the read-write heads from one cylinder to another. How loss of reading and writing time from and to disk is minimized in accordance with one of the inventions will now be discussed in reference to FIGS. 3 and 10.

FIG. 3 suggests that VPC 26 has the data indicative of the bad sectors, for example, in the several disks 0-4 on which image data is to be recorded. Every time an index signal occurs, VPC 26 sends out the command data for the disk drive to a group of next command registers as labeled in FIG. 3. One register 91, marked command, receives coded information that is typically required for controlling a disk drive. Another register 92, labeled cylinder, receives data from VPC 26 that governs cylinder selection. Another register 93, labeled head, has the coded information for determining which readwrite heads, 0-4, will be activated and when they will be activated or switched. Register 94, labeled bad sector, stores a digital word wherein 0's might indicate the bad sectors related to the particular cylinder and head positions that are in effect. Another register 95 labeled image start, has the information indicative of when image data from a page should start to be written in relation to the data pertaining to the cylinder, head and bad sector conditions. Next command registers 91-95 are loaded with information after the occurrence of each index pulse, that is, these registers are loaded once before every disk revolution. However, the commands that are loaded are not those which apply to the current rotation of the disk but, instead, apply to the next revolution in sequence. In other words, the commands in registers 91 and 95 at any time will be executed upon occurrence of the next index pulse.

Figure 10:
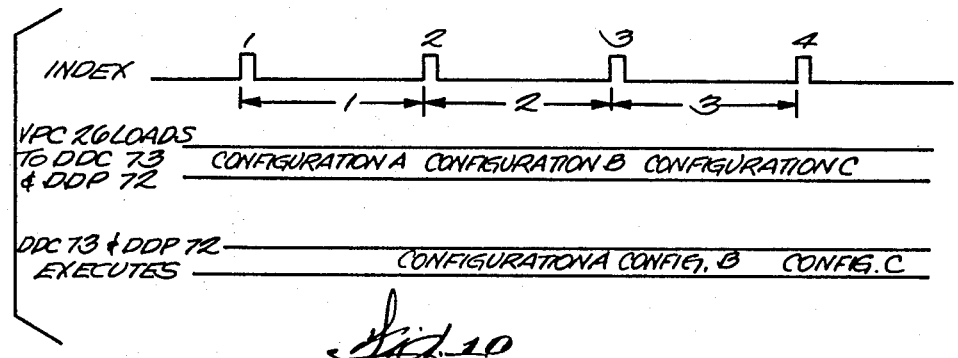
FIG. 10 is an additional timing diagram pertaining to operation of the disk drive.

As shown in FIG. 10, when the first index pulse occurs, VPC 26 loads the next command register information into DDC 73 and DDP 72. As shown in the lowermost line of FIG. 10, the data for configuration A of the disk in the next command registers stays there until index pulse 2 occurs and, as indicated in the lowermost line in FIG. 10, when index pulse 2 occurs the commands are executed by DDC 73 and DDP 72.

As shown in FIG. 3, the commands stored in command registers 91-95 during a preceding disk rotation are executed during the next rotation by virtue of the fact that the commands are presently in execution registers 101-105. The command, decode and timing register 106 does the decoding in a conventional manner. A buffer memory 107 is provided and it receives signals by way of multiple lines 108 which indicate when a new cylinder should be selected. Execution register 102 provides the data to buffer 107 indicative of the cylinder that should be selected. This information is output on multiple lines 109 to a conventional storage module display (SMD) interface, not shown, since it is a standard part of Winchester disk drives as is known by those skilled in the art.

In FIG. 3, command, decode and timing register 106 provides signals by way of multiple lines 110 to a buffer 111 to control the time when new heads are to be selected and execution register 103 provides the identification of the head. The head select lines 112 also are input to the SMD interface.

In FIG. 3, a shift register 113 is provided and its data is shifted upon receipt of sector pulses from disk by way of line 114. Data indicative of the bad sectors in the particular cylinder and head positions is stored in execution bad sector register 104. As bad sectors come up, the output line 115 of shift register 113 changes state as do the outputs of AND gates 117 and 118. When there is a state change on the output of AND gate 117 and 118, writing to or reading from disk is interrupted for the duration of the bad sector.

In FIG. 3, execution register 105 has the data indicative of when writing an image on disk should start. A counter 119 counts the sector pulses from disk so the sectors under the read-write heads at any given time are always known. The states of the counter are output on multiple lines 120 to a FIFO (first-in first-out) input control which is indicated in FIGURE 3 by the block marked 121 and has output lines 122 which lead to the DBM controller which will be discussed shortly hereinafter.

Before leaving FIG. 3, it should be noted that the host CPU 27 simply sends general commands to VPC 26 such as to request VPC 26 to effectuate writing an image on disk. The VPC has the duty of maintaining the bad sector map and to exercise such control as to prevent overlap of cylinder boundaries and do single track seek steps. VPC 26 has memory in which all of the data pertaining to location of images on disk is stored. If, for example, host CPU 27 requests retrieval of the 200th image on disk, the VPC 26 decodes this message and through the disk controller and synchronization system shown in FIG. 3 identifies everything pertinent to location of the image for bringing about transfer of the image data from disk to a disk buffer memory 59 page where the data comes under the control of the video circuit timing before it is converted to appropriate form for display on the video monitor 71 in FIG. 1.

Now that some of the features of the digital disk controller have been described in reference to FIG. 3 and now that the timing of data transfer to and from disk has been examined, consideration can now be given to the process of transferring video image data to the parallel input disk drive. Attention is invited to FIG. 4. The video digitized pixel data input bus is marked 60 in this figure as it is in FIG. 1. The video pixel data for successive images is input to the respective pages of DBM 59. For the sake of convenience, each page of DBM 59 can be looked upon as being an x,y array of memory locations each of which corresponds to a possible pixel location. Video data input to DBM 59 uses the video system time base. In other words, every time a vertical blank pulse occurs, writing into a page of DBM 59 begins. In one-thirtieth of a second frame time, when one page is filled, the next vertical blanking pulse causes the frame data to be switched into the next DBM page, etc. In this particular example, the DBM has four pages and can hold up to that many images at one time. However, as one page is being read out of DBM 59 and written on disk, another page which has been previously read out begins to fill with pixel data and readout just continues to recycle in this manner as long as digitized X-ray or video images continue to feed the DBM. FIG. 4 shows memory controller 61 in block form but it will be described in more detail later. For present purposes it is sufficient to recognize that the memory controller sends out read addresses of the DBM 59 by way of bus 62 if the DBM is being read out for transfer of data to disk. Memory controller 61 also sends out the addresses for writing the incoming video data into the pages of DBM 59. The addresses for writing video pixel data into DBM 59 are compatible with the vertical blank time base provided by the video system. The disk drive has its own time base which differs from that of the video system. Hence, the addresses for reading out of DBM write onto disk are supplied at a different rate than the addresses that control video data input to DBM 59. The output bus from DBM 59 is marked 125 in FIG. 4 as it is in FIG. 1. In this particular example, bus 125 has a capacity for transmitting pixels comprised of eight to twelve bits. For cording at video frame rates, 8-bit pixels are used. Bits for the pixels are parallel and are input cyclically to several FIFOs 126-130. When readout of a DBM page starts the first five pixels would do the same so that pixels can be stacked up in the FIFOs to account for the fact that pixels may be going out of DBM 59 faster than they can be transferred out of the FIFOs to the DBM. The pixel inputs to the FIFOs is timed or maintained in synchronism by the control signals delivered over lines 131 from the FIFO input control 121 which was previously mentioned in connection with FIG. 3. When the FIFO input control detects that the FIFOs are ready to receive data, the control issues a read request to the memory controller 61 by way of line 132 and when the memory controller is ready to transfer the data out of DBM 59 it issues a read acknowledge signal by way of line 133 to the FIFO input control and the data is transferred. The parallel bit pixel data is output from the FIFOs under the control of gating signals over lines 134 that are supplied from the FIFO output control 123. The outputs of the FIFOs are coupled, by way of buses, such as the one marked 135, to the inputs of a group of parallel-to-serial converters (p/s) 136-140 wherein each pixel is converted to a serial bit stream which is required for writing on the several disks 0-4 simultaneously as previously explained. In FIG. 4, the serial bits comprising each pixel are transmitted from the disk data processor (DDP) 72 to the disk 50 by way of the channel lines that are marked 0-4. In FIG. 4 the next command register 91 and its related execution register 101 are shown as they were in FIG. 3. One of the commands is to effectuate output of the serial bit streams by delivering appropriate timing signals by way of lines 141 to the p/s converters. In FIG. 4, the image start next command register 95 and execution register 105 and counter 119 are also the same devices as appear in FIG. 3. These components will be discussed in greater detail later in reference to FIG. 6 where the construction and function of the memory controller will be elaborated.

As is typical in single disk as well as multiple disk Winchester drives, data is written on disk in serial form in synchronism with the high speed clock of the disk. The parallel transfer drive writes or reads multiple channels of digital data simultaneously. All five channels of data are written onto the disk drive synchronously with a master write clock. However, during readback the drive transmits to the DDP 72 the data and a clock for each channel. Each channel's readback data is synchronous to its own clock only, therefore a timing skew between the different channels can result. In accordance with one feature of the invention, the data that is fed back to the system is deskewed with a circuit shown in FIG. 7. There are actually as many of these circuits as there are read/write channels in the disk drive. FIG. 7 shows data channel φ as coming from disk drive. The first stage of the deskewing circuit is a serial-to-parallel converter 155. The operation of reading digital data into converter 155 and corresponding converters in other channels is initiated by master sequencer 160 issuing a read enable signal to the converters by way of line 166. The serial data for each channel along with a bit read clock signal on line 156 is input to serial-to-parallel converter 155. The data input is a series of bits comprising a pixel. The converter 155 forms a nibble composed of a predetermined number of bits such as 4 in this example, that is, it repeatedly takes 4 successive bits of a pixel or other group of bits that may have been recorded and feeds the nibbles into a latch 157. The nibble is also input to a sync detector 158. The data coming from the disk is formatted into a specific form. A preamble of all zeros precedes any active data, followed by a known data pattern, namely the sync data word recorded in a sector field preceding active image data as is the regular way of detecting the start of user's data in Winchester type disk controllers. When the sync data is detected by detector 158 active data is present and a read sequencer 165 can begin latching the nibbles out of the converter 155. For every 4 read pixel rate clocks, converter 155 is controlled to latch in a new 4-bit nibble. The read sequencer provides the latch input clock by way of line 167. Another clock by way of line 167 shifts the nibbles into a first-in, first-out (FIFO) memory 159. The FIFO memory is the elastic element between the multiple channels and is used to accommodate the skew. The worst case skew between channels is a specified amount. Therefore, after the appropriate number of shifts into FIFO 159 in one channel it is guaranteed that all channels will have data in their FIFOs. A master sequencer 160 using the index and sector timing pulses as a time base sends out clocking signals by way of line 162 at a fraction of bit rate frequency which is one-fourth of said frequency in this example, for effectuating transfer of the 4-bit nibbles from FIFO 159 to parallel-to-serial converter 163. The master sequencer also sends out the same clocking signal to the sequencers and FIFOs in the other channels as indicated by the clock signal lines 168. Four bits in parallel come out of FIFO 159 on the respective lines 162. This FIFO may have, for example, thirtytwo register stages although fewer than that are ordinarily needed. In any event, the nibbles from cornarily responding FIFOs 159 in all channels are output at the identical time to a parallel-to-serial converter 163 due to the common nibble rate clock provided by way of line 162. The 4-bit nibbles, now in synchronism with each other in all channels are converted to a serial bit stream and are output from parallel-to-serial converter on lines such as the one marked 164. The parallel-to-serial converter is clocked at a bit rate frequency by clock lines 161 from the master sequencer 160. This same clock line is routed to the other parallel channels as indicated by lines 169.

It should be recognized that the deskewing circuit does not have to be restricted to forming 4-bit nibbles. A serial-to-parallel converter 155 that arranges 8, 10 or 12 incoming serial bit groups in parallel per cycle could be used. Latch 157, FIFO 159 and parallel-to-serial converter 163 would, of course, have to be expanded correspondingly. However, the fewer the number of bits in a nibble the lower is the probability that a bit will be dropped or missed. The deskewer can be used to deskew in other applications where serial bits forming bit groups are obtained from possibly asynchronous sources. The bit groups are not limited to pixels, they could be bytes or words of any bit length. If there were 8-bits in a group, for example, the latch clock frequency would be one-eighth of the bit rate frequency.

As indicated, for real-time recording of image frames on disk, mechanical time constraints of the disk may limit pixel length to 8-bits. However, when there are some open frames between X-ray exposures, it is possible to generate and record pixels of greater bit length such as up to 12-bits. Likewise, the recorded pixel data must be reformatted from serial form as they are recorded on disk to parallel form of proper bit length before they are sent from the deskewing circuit of FIG. 7 back to disk buffer memory 59 from which they may be transferred out to effect display of an image using the video circuit blanking pulse rate as the time base.

FIG. 5 shows the circuitry interfacing the deskewing circuits of FIG. 7 with the digital buffer memory DBM 59. In FIG. 5, the deskewing circuits for channels 0 to 4 are represented by blocks labeled deskew. Typical output line 164 from the deskewing circuit conducts the pixel values with their bits arranged in serial form to the input of a serial-to-parallel (s/p) converter 165. The other channels have similar converters 165-169 in them. Converters 165-169 convert the deskewed and synchronized serial pixel data to parallel bits comprising a pixel. The pixels in parallel bit form are output from the converters 165-169 to FIFOs 170-174. The pixels are output in sequence from FIFOs 170-174 through a multiplexer (MUX) 175 from which they are addressed to the same locations in DBM 59 as they had when they were fed into the DBM from the video circuitry before the pixel data was recorded on disk. In FIG. 5, memory controller 61 addresses the pixels to their proper locations. The write addresses for writing data from disk to DBM 59 are provided over bus 63 from memory controller 61 to DBM 59. The write addresses are generated according to the time base of the disk. When the image data is read out of DBM 59, the data is addressed by way of read address bus 64 at a rate based on vertical blank frequency. Thus, video data goes out from buffer memory on bus 65 as shown in FIGS. 5 and 1.

The components in FIG. 5 for timing data transfers are comparable to those used in FIG. 4. The pixel rate clock controls input of the data to the deskew circuits by way of line 178. This clock is supplied to a data deserializer control 179 which supplies the timing signals to the deskew circuits by way of a bus 180 and to the s/p circuits by way of a bus 181. Data transfers into and out of the FIFOs 170 are effected by FIFO input control circuit 191 and FIFO output control circuit 192 which are simply synchronizing or timing circuits. Again, when data is to be transferred out of the FIFOs 170-174 a write request signal is issued to the memory controller and when it is ready to effectuate a transfer and addressing of the pixels to the proper places in DBM, the controller issues a write acknowledge signal and the data is transferred. In FIG. 5, the next command register for image start information 105 and the execution register 101 are repeated as is counter 119.

As indicated earlier, the disk recorder is limited in the amount of data it can record in any given time period so, in this example, it has been indicated that to record video image frames continuously at thirty frames per second a pixel length has to be limited to 8-bits. In some X-ray procedures, for example, a number of frame times may elapse between X-ray exposures in which case there is enough time to allow for recording pixels with bit lengths of up to 12-bits. As a practical matter, bit lengths of eight, nine, ten, eleven or twelve may be used. When the pixels are read out of disk they come out on the respective channels in serial form and ultimately leave the deskewing circuits in serial form before they enter the serial-to-parallel converters 165-169 as just described in reference to FIG. 5. Thus, the serial-to-parallel converters 165-169 are a novel type that are programmable to convert serial bit streams into pixels having a preselected bit length. The new programmable variable length serial-to-parallel converter corresponding to any one of the converters 165-169 in the respective channels in FIG. 5 is shown in FIG. 8. In FIG. 8 the serial data stream input on line 164 is from the deskew circuit related to one of the five data channels. The input is to programmable array logic (DAL), a data routing circuit in rectangle marked 170. The serial pixel data is to be converted into pixels having a predetermined number of bits. Selection of the number of bits is determined by data sent to a next command register 171 from VPC 26. As previously described, when an index pulse is received from the disk, a command that has been in a next command register is read into the execution register 172 and held for at least one rotation of the disk. In this particular example, conversion of the serial bit streams to eight, nine, ten, eleven or twelve-bit deep pixels is contemplated. This amounts to five different bit lengths. A 4-bit word coming out of execution latch 172 on line 173 can specify any of 8 to 12-bits. The 4-bit words on lines 173 are input to a four-line-to-one-of-sixteen decoder 174 in PAL 170. The PAL includes some AND gates 175-183 and OR gates 184-187. The serial data is fed to a corresponding input of each of the AND gates by way of a common line 188. Assume, for example, that the command from latch 172 is decoded by decoder 174 such that the 8-bit output line goes to a high logic level. In other words, the serial data in is to be converted to a parallel bit pixel value of 8-bit depth, that is, there will be eight significant bits and the four remaining bits will, in this example, be all zeros. Assume now that a bit stream is being fed in by way of lines 164 from the doskew circuit. Assume that the first 8-bits are all logic ones. With the 8-bit select line 189 at a hlgh logic level, the input to AND gate 182 to which it is connected will remain at a logic one level. Now the first logic one in the bit series comes in by way of lines 164 and 188 and is supplied to common inputs of AND gates 175-182. However, only AND gate 182 has been enabled by 8-bit line 189 going high. Thus, the output of AND gate 182 goes high and this signal is gated through OR gate 187 to data input D4 coincident with a bit rate clock pulse on line 191 which is supplied from a master scquencer. When the next bit comes in on line 188, assuming now that it is a logic one, the output of enabled AND gate 182 goes high again and OR gate 187 propagates this logic one to data input D4. Meanwhile, upon occurrence of the second clock pulse the preceding one level on D4 of registers 190 appears on Q4 and data input D5 of registers 190. When the next bit and bit rate clock pulse occur, the first logic one is stepped to output Q5 on register 190. When output Q5 of register 190 is at logic one, this signal is transmitted by way of line 193 to data input D6 of registers 192. This stepping from stage to stage continues such that the six output lines Q6 and Q11 on register 192 will all be at a high logic level and so will Q5 and Q4 outputs of registers 190. Examination of the circuit will show that in the 8-bit conversion case, the four outputs Q$\phi$ to Q3 of registers 190 were reset to zero initially remain at all zeros. Thus with Q0 and Q3 at logic zero level and Q4 to Q11 at logic one level in this example, these signals are stored momentarily in latches 194 and 195. Now there is a pixel rate clock signal supplied from the master sequencer over line 196 in FIG. 3. This is the clock for causing the latches to switch their signals to their six output lines 197 and 198 with the least significant bit (LSB) appearing on the lowermost output line of latch 195, all logic ones appearing on the six output lines 198 and the lowermost two output of lines 197 from latch 194. The uppermost four output lines 197 would all have zeros on them in this example.

Operation of the variable bit length serial/parallel converter in FIG. 8 would be similar if, for example, the pixels' length selection register were given a command to convert the serial bit data into pixels having a 12-bit length. In such case the 12-bit line out of decoder 175 would go high to enable AND gate 175 to act as the input gate to data input D$\phi$ of registers 190 and the bit values would be stepped through the registers 190 and 192.

It should be understood that there is one serial/parallel converter of the type shown in FIG. 8 for each disk output channel. To summarize, the image pixels stored on the digital disk drive are of varying bit length, from eight to twelve-bits in this example. The serial bit streams from the drive are converted into pixels of appropriate bit length by the programmable serial/parallel converter of FIG. 8. It sets all leading bits to zero in pixels of length less than 12-bits. The serial data is input to the PAL 170 and is output to the appropriate bit location of a conventional serial-to-parallel converter. The bit location where the input bit will go depends on the four pixel length selection inputs in this example. After the appropriate number of bit rate clocks to the converter registers, latches are clocked to capture the pixel in parallel form. In this manner, the PAL 170 is placed in the feedback path of the first four bits of the converter and performs the multiplexing function on the input data as well as packing zeros into all unused higher order bits. The converters of FIG. 8 are physically located in the disk data processor 72. The converters were previously mentioned in connection with describing reading from disk and writing into digital buffer memory 59 in reference to FIG. 5. Referring again to that FIGURE, it will be seen that the parallel pixels operated on by the converter of FIG. 8 are conducted by way of multiplexer 175 in FIG. 5 through a bus 200 to DBM 59. They are addressed to the proper locations by memory controller 61 as shown in FIG. 5. As previously indicated, the pixels are written into DBM 59 in synchronism with disk timing signals but they must be read out for display from DBM 58 at rates using the vertical sync pulses of the video system as the time base. The application of the converter to converting serial image pixel data to parallel data is illustrative, but, as those skilled in the art will recognize the variable bit length converter can be used whenever parallel data is transmitted as a serial bit stream that must be reorganized as parallel bit data again.

Another new feature of the system shown in FIG. 1 is the manner in which the time for transferring image data from the disk buffer memory 59 to the disk recorder is minimized so as to not exceed the recording rate of the parallel transfer disk drive. As stated earlier, the X-ray image field is circular. Assume that the pages of the disk buffer memory are a rectangular array of memory locations that can be identified by their x,y coordinates. Thus, when the video pixel signals, that are output from DVP 32 on bus 60 in FIG. 1, are being written into disk buffer memory 59 it is on a horizontal line by horizontal line basis. The horizontal line time is longer than 512 pixels and if there are more than 512 horizontal lines in a raster the circular image will not overlay the full widths of the horizontal lines nor will it overlay all of the horizontal lines in the vertical direction. Since the video signals are clocked into the disk buffer memory array pixel after pixel throughout all of the horizontal lines it does not make any difference that nonexistent memory locations surrounding the circular image are addressed. However, when a disk buffer page is being read out to allow writing of the image data onto disk, transfer time of the data from the DBM 59 can be minimized if only pixels within the image circle that contain useful diagnostic information are addressed and transferred to disk. Likewise, if only the data representing the circular or useful image area is recorded on disk, time can be saved if it is read out of disk and written only into the DBM 59 locations that need to be addressed in order to reform the image data in the memory in the original circular pattern.

FIG. 6 shows the components of memory controller 61 which are involved in only addressing or reading from the DBM 59 and writing on disk, pixels that are inside of the circular image boundary. When a video vertical blank pulse occurs to initiate an image frame, a counter begins to count the horizontal raster lines from the top of the image down to the point of tangency of a horizontal line with the topmost pixel in the circular image which may be on the topmost horizontal line or lower. This is the first pixel or group of pixels that are addressed for being accessed from the DBM and written on disk. From that time on, horizontal lines are counted downward and a new X-start address, corresponding to where the first image pixel appears on a line is provided. As will be shown, in accordance with the invention, no X-stop address where image pixels end on each horizontal line need be provided since ending readout of any horizontal line is accomplished by taking advantage of the fact that the circular image is symmetrical. A detailed description of how a circular image is accessed from DBM 59 and written on disk will now be set forth in reference to FIG. 6 but it should be understood that images of other shapes could be written on disk in the same way as long as they are symmetrical about a center line on the video monitor screen.

In the upper left of FIG. 6 there is a multiple line or bus coming from the video processor controller or VPC 26. VPC 26 provides a Y-read start address by way of this bus. The Y-direction is downward from horizontal line to horizontal line, the X-direction is along the row of pixels comprising a horizontal scan line. The Y-read start address is inserted in a register that is so labeled and marked 210. There is a multiplexer 211 shown to the left of the Y-read start address register. It has two inputs marked T and D. T stands for television or video timing rate and D stands for disk timing rate. Disk timing is applicable to writing on and reading image pixel data from disk. The Y-read start address is inserted in register 210 by VPC 26 but nothing happens until an image-start signal is provided by DDP 72 over the line labeled image-start and marked 212. The image-start signal is indicative of the time when writing on disk is to start since it must occur when the disk write heads are on a sector on which no image data is written as yet. It may be noted that an output line 213 from the Y-read start register provides a signal derived from VPC 26 that selects the page in DBM 59 from which the image is to be read. The image-start signal is coupled from the D input through multiplexer (MUX) 211 to a Y-read counter represented by the block marked 214. The Y-read counter counts down the horizontal lines from the first line and when it gets down to the first horizontal line on which there is image data that might be called a point of tangency with the circular image, the first Y-read address is delivered through a MUX 215 and this address is transmitted by way of Y-address bus 216 to the address decoder, not shown, of the DBM 59. The Y-read counter 214 is incremented at the end of image data in every horizontal line by a read end-of-X signal. This read end-of-X signal is received over a line 217 and goes to the D input of a MUX 218 whose output line leads to the Y-read counter 214 for incrementing the counter. The end-of-X signal is provided so readout in the horizontal direction will not extend beyond the image circle to the end of a horizontal line being read out since there is no image information beyond the circle. Of course, an X-read address must also be provided to the DBM 59 along with each Y-address. The count of the Y-read counter 214 is fed by way of a bus 219 to an X-read start programmable read-only memory (PROM) 220 which could be a RAM if data for various image sizes or shapes is to be programmed. Memory 220 contains a lookup table and could be a random access memory 220 in which approximate X-read start addresses for the lines are stored. In any event, when the first horizontal line containing useful pixel data within the image circle is reached as a result of countdown by the Y-read counter, the count of the counter constitutes an input address to the PROM 220 which address is the number of the horizontal lines that have been counted and whose output is the X-read start address for the particular horizontal line down to which the count has been made by the Y-read counter 214. The X-read start address for any horizontal line is coupled by way of a bus 221 to an input of a MUX 222 which has two inputs one of which is shown connected and identified by a small circle and another of which is simply grounded in this example and is identified by a rectangle. The implication here is that the disk buffer memory can also be read out in ordinary rectangular coordinate form where all pixels are read out whether they contain image information or not. In accordance with the invention, however, the X-start addresses are transmitted through MUX 222 and through the D input of a MUX 223. The addresses are further transmitted through an X-read counter 224 and another MUX 225 from which they are transmitted by way of an X-address bus 226 to an address decoder, not shown, which is part of a memory array as is well known.

Every time pixel data is transferred out of a selected DBM 59 page after the X-read start address is executed in a given horizontal line, the X-read or pixel counter 224 is incremented. The increment signal is from the FIFO input control 121 as described in connection with FIG. 4 wherein the memory controller 61 receives a read request from the FIFO input control and issues a read acknowledge signal on line 133. This is symbolized in FIG. 6 where the read request line 132 and the read acknowledge line 133 are shown. The increment signal is delivered to the X-read counter 224 by way of a line 227 which connects to the D input of a MUX 228. The increment signal is finally output to the X-read counter 224 by way of line 229. A branch bus 230 coupled to the output bus from the X-read counter has the current X-address for any given horizontal line on it. Bus 230 is coupled to input A of a digital comparator 231. The address when reading in the X-direction on any given horizontal line that is output from the X-read start PROM 220 is coupled by way of a bus 232 to a 2's complement device 233. The start address is 2's complemented in the traditional way by converting all 0's in the digital address to 1's and all 1's to 0's and then adding a 1. As is known, this yields what is essentially the negative of the original number which, in this case, is the X-read start address for any horizontal line lying within the image circle. Since the circle is symmetrical about a vertical center line, the current X-read address to input A of the comparator can be compared with the X-read start address as 2's complemented. It is like counting pixels from the X-start point on a horizontal line to the center and then counting down by an equal amount to reach 0 as indicative of the end-of-X. The comparator 231 achieves the same result. When a comparison is made the end-of-X is indicated and there is an output signal which is transmitted to the Y-read counter 214 by way of previously mentioned line 217. This increments the Y-read counter 214 and provides a new address to the X-read start PROM 220 so it can generate the X-read start address for the next and ensuing horizontal lines that begin and end in the image circle. The X-read counter 224 is loaded with a start address by either an image-start signal coming through line 212 at the start of a line with image data or by the read end-of-X signal on line 217 subsequently. Both signals are gated through an OR gate 234 and coupled through a MUX 235 to the X-read counter 224. As mentioned in the earlier discussion of the overall read system in connection with FIG. 4, the pixels that are output from DBM 59 on bus 125 are input to the respective FIFOs 126-130 after which the pixels are converted to serial data in converters 136-140, located in DDP 72, and then transmitted, respectively, as serial bits along parallel channels 0 to 4 to the disk inputs for the consecute pixels to be written on the respective disks simultaneously.

Reading image data from disk and writing onto a page of DBM 59 will now be described. As shown in FIGS. 1 and 6 image data is routed from DDP 72 to DBM 59 by way of a bus 200. In FIG. 6, the bus in the upper left region from VPC 26 is used again to download the Y-write start address into a register 250. After the Y-write start address is loaded nothing happens until an image-start signal is provided by DDP 72 on line 212. This assures that the disk read heads are on the sector from which an image data read is to start. The page in DBM 59 to which the image data is to be written is enabled by a signal over line 299. The image-start signal is coupled from the D input of a MUX 298 to the Y-write address counter 300. The Y-write start address in register 250 is the address of the horizontal line on which image data to be written is present. This start address is loaded in response to occurrence of the next image-start signal. The Y-write address counter 300 will then contain the address of the first horizontal line to be written. The Y-write address is delivered by way of MUX 215 and Y-address bus 216 to the address decoder, not shown, for the DBM page.

The Y-write address counter 300 is incremented at the end of every horizontal line by a write end-of-X signal on line 317 and gaes through MUX 318 to counter 300. The Y-address count is also sent by way of a bus 302 to the X-write start memory, which may be a PROM or RAM, 301, to determine the X-location of the first image pixel that is to be written on the horizontal line. Memory 301 constitutes a lookup table of X-write start addresses for each horizontal line.

The X-write addresses are generated by the X-write counter 303. The X-write start addresses are transmitted from X-write memory 301 through a bus 319, a MUX 304, the D input of a MUX 305 and from its output to the X-write counter 303. The X-write addresses for the corresponding Y-addresses are then input by way of X-address bus 226 to the address decoder of the DBM 59. The output of the X-write start memory 301 is also transmitted by way of a bus 306 to a 2's complenting device 320. The 2's complement of the X-write start address for the current horizontal line is delivered from device 320 by way of a bus 321 to input B of a comparator 307. The current X-write address in X-write counter 303 is supplied by way of a bus 322 to input A of comparator 307. Comparator 307 compares the current X-address and the 2's complement of the X-start address and when these values compare, the resulting end-0f-X signal on line 317 is transmitted through MUX 318 to increment Y-write counter 300 to the next downward horizontal line address. The X-write counter 303 is loaded with a start address by either an image-start signal coming through line 212 at the start of the line with image data or subsequently by the write end-of-X signal on line 317. Both signals are gated through an OR gate 323 and coupled through a MUX 324 to the X-write counter.

The X-write counter 303 is incremented by the write acknowledge (WR ACK) signal on line 325 from the synchronization circuit 326 after pixel data has been written. The WR ACK signal originates from receiving a write (WR) request from DDP 72 on line 327. These signal lines are also shown in FIG. 3.

Thus, as has been shown, the circuit of FIG. 6 permits reading out of DBM 59 and writing onto disk and, conversely, reading out of disk and writing into the DBM only the image data with the boundaries of a symmetrical image. The pixels surrounding the image, which would be background for the image essentially need not be addressed so the time for transferring image data from disk to DBM and from DBM to disk is minimized. In summary, in both types of transfers, the X-start address for each horizontal line is loaded from the X-write (X-read) address counter depending on which horizontal line, identified by the Y-address is being written (read). The X-write (X-read) address starts at this location counts through the next addresses being incremented by the write (read) acknowledge signals. A new start address is loaded into the counter at the end of each horizontal line or the start of an image. The end of the image data, that is, X-end is determined by comparing the current X-address with the 2's complement of the X-start address which is possible because the images are assumed to be symmetrical about a vertical center line through the image which is coincident with an imaginary vertical center line crossing the horizontal lines on the display screen.

Although what are believed to be the best modes of implementing the various inventive concepts have been described in detail, such description is intended to be illustrative rather than limiting, for the inventions may be variously embodied and are to be limited only by interpretation of the claims which follow.

We claim:

1. In a system comprising a video camera means and means for generating symmetrically shaped images such as circular and rectangular images that are converted by the camera means to analog video signals, means for converting the analog signals for each image frame to digital data having values corresponding to the intensities of the picture elements (pixels) composing the images, a digital disk drive operable to record digital data on magnetic disk, an addressable digital buffer memory (DBM) means coupled to the recorder to permit reading image pixel data from said memory means and writing the data on disk and alternatively reading image data from disk and writing said data into said memory means, said disk drive issuing an image-start signal when the read/write heads of said recorder are in readiness for beginning to read or write an image, and means for reducing disk storage requirements by limiting the data transferred to and from said buffer memory to valid pixel data actually representing image information, comprising:

a first register means loaded with the digital Y-read start address of the first horizontal line on which valid image data is to be read from a frame in the DBM, a first counter having input means for said Y-read start address and starting to count in response to said image-start signal, said counter being incremented by one for every horizontal line so as to produce the succession of Y-addresses indicative of the lines on which valid image data appears, means coupling the Y-addresses produced by said counter to the address input means of said DBM, an X-read start address memory means having input and output means and containing a lookup table providing the X-addresses of the first valid image data pixel in each horizontal line, said memory means responding to input of the current Y-addresses from said first counter by output of the X-address of the first valid image pixel data in the corresponding horizontal line, an X-read counter having input and output means, said input means coupled to the output of said X-read start memory for being loaded successively with said X-read start addresses in the order said memory receives the Y-address indicative of the line in memory that is being read, said X-read counter being incremented by one for successive pixel X-positions in the line, the X-read counter thereby providing on its output means the X-addresses for the pixels in the horizontal line for any line whose Y-address is currently input to said DBM, means for coupling said X-addresses related to the current Y-address from the output means of X-read counter to the address input means of said DBM to thereby read the pixel data from the DBM, a 2's complement device having input means for the X-start address for the valid image pixels in a line and having output means, said 2's complement device being operative to convert said X-start addresses to the negative equivalent of the X-start addresses, comparator means having one input for receiving the 2's complemented X-start addresses and another input for receiving the current pixel X-addresses from the output of said X-read counter, said comparator having output means and responding to the 2's complemented X-start address for a horizontal line and the current X-address from said counter comparing by providing an end-of-X signal on the comparator output means indicative of where reading of valid image data on the horizontal line must end for the image to be symmetrical, and means for applying said end-of-X signal to said Y-read address counter to increment said counter and provide the new Y-read address to said X-read memory lookup table so it can generate the X-read start address for the next horizontal line.

2. The apparatus according to claim 1 including means for reading image data from disk and writing said data only in buffer memory locations defining valid image data defining a symmetrical image, a third register means loaded with the digital Y-write start address of the first horizontal line on which valid image data is to be written in the DBM while being read from disk, a third counter having input means for said Y-write start address and starting to count in response to said image-start signal, said counter being incremented by one for every horizontal line so as to produce the succession of Y-addresses indicative of the lines on which valid image data is to be written into the DBM, means coupling the Y-addresses produced by said counter to the address input means of said DBM, an X-write start address memory means having input and output means and containing a lookup table providing the X-addresses of the first valid image data pixel in each horizontal line, said memory means responding to input of the current Y-addresses from said third counter by output of the X-address of the first valid image pixel data in the corresponding horizontal line, an X-write counter having input and output means, said input means coupled to the output of said X-write start memory for being loaded successively with said X-write start addresses in the order said memory receives the Y-address indicative of the line in memory that is being read, said X-write counter being incremented by one for successive pixel X-positions in the line, the X-write counter thereby providing on its output means the X-addresses for the in the horizontal line for any line whose Y-address is currently input to said DBM, means for coupling said X-addresses related to the current Y-address from the output means of X-write counter to the address input means of said DBM to thereby write the pixel data from the disk into the DBM, a 2's complement device having input means for the X-write start address for the valid image pixels in a line and having output means, said 2's complement device being operative to convert said X-write start addresses to the negative equivalent of the said addresses, comparator means having one input for receiving the 2's complemented X-write start addresses and another input for receiving the current pixel X-addresses from the output of said X-write counter, said comparator having output means and responding to the 2's complemented X-write start address for a horizontal line and the current X-address from said counter comparing by providing an endof-X signal on the comparator output means indicative of where writing of valid image data on the horizontal line must end for the image to be symmetrical, and means for applying said end-of-X signal to said Y-write address counter to increment said counter and provide the new Y-write address to said X-write memory lookup table so it can generate the X-write start address for the next horizontal line.

* * * * *